Sept. 9, 1952    J. A. CRANFORD    2,610,229
CONTINUITY TEST APPARATUS
Filed Sept. 16, 1950

INVENTOR
J. A. CRANFORD
BY *W.C.Parnell*
ATTORNEY

Patented Sept. 9, 1952

2,610,229

UNITED STATES PATENT OFFICE 2,610,229

CONTINUITY TEST APPARATUS

Jesse A. Cranford, Buffalo, N. Y., assignor to Western Electric Company, Incorporated, New York, N. Y., a corporation of New York Application September 16, 1950, Serial No. 185,283

4 Claims. (Cl. 175—183)

This invention relates to testing apparatus and more particularly to a test circuit for determining the condition of electrical conductors.

In connection with the manufacture of electrical conductors, it is customary to test the conductors before shipment to determine if they contain open circuits or if groups of conductors contain short circuits. Similar tests are often necessary after the conductors have been placed in service, to discover subsequent defects. Since this testing is usually done one wire at a time, the operation becomes laborious and time consuming, and there has been a need for apparatus which would expedite such tests. It is therefore an object of this invention to provide such apparatus.

Applicant accomplishes his object according to the invention by applying voltages in quadrature across the diagonals of a bridge to whose terminals are connected four wires to be tested. Application of the voltages causes lamps located in the bridge arms and diagonals to give a simultaneous indication of the good or shorted condition of all possible pairs. Five conductors may be tested simultaneously by connecting the fifth conductor to the midpoints of the diagonals, while, if the far ends of the conductors are bonded together, the apparatus indicates the existence of open circuits.

Other objects and advantages will be apparent from the following detailed description taken in conjunction with the attached drawings in which.

Figure 1:
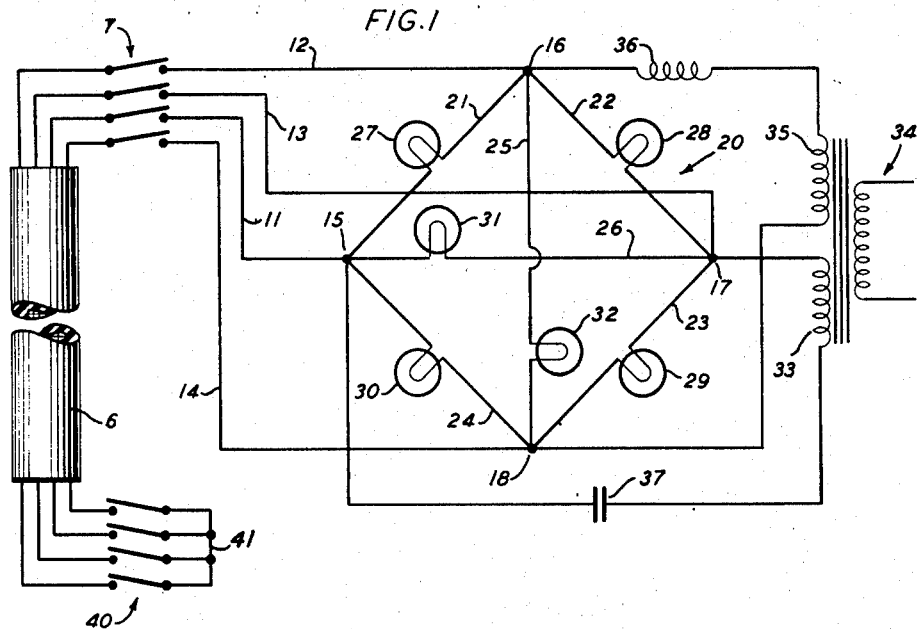
Fig. 1 is a schematic wiring diagram of the circuit used for simultaneously testing four conductors.

With reference to Fig. 1 of the drawing, four electrical conductors 11, 12, 13, and 14 to be tested are connected to terminals 15, 16, 17, and 18 of a Wheatstone bridge generally designated as 20. These conductors may be individual wires or may be part of a cable 6 as shown, and may be connected directly to the bridge terminal or through an intermediate switch 7, which may take the form of a telephone jack. The bridge 20 has four arms 21, 22, 23, and 24, and two diagonal bridge connections 25 and 26. Indicating lamps 27, 28, 29, 30, 31, and 32 are connected in series in the bridge arms and diagonal connections, as shown on the drawing.

Figure 2:
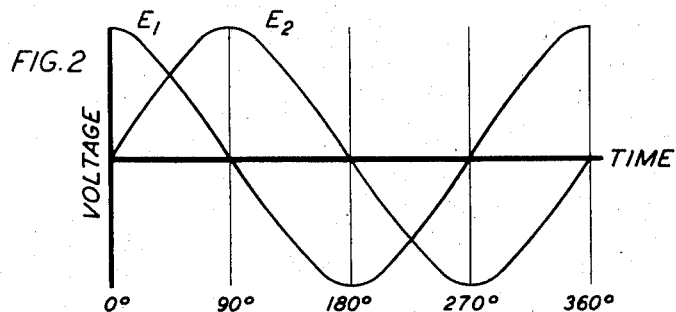
Fig. 2 shows the phase relationship between the two voltages impressed across the test circuit.

A potential E1, supplied from a secondary winding 33 of a transformer 34 is impressed across the terminals 15 and 17 of the bridge. A potential E2, taken from secondary winding 35 of the transformer, is correspondingly impressed across terminals 16 and 18 of the bridge. It is desirable that these voltages be approximately 90 electrical degrees apart and to this end an inductance 36 is connected into the circuit for voltage E2 and a capacitance 37 is inserted in the circuit for voltage E1. Values for the inductance 36 and the capacitance 37 are so chosen with respect to the resistances of the test circuit that the two voltages will be displaced from each other approximately 90°, as shown in Fig. 2. Placing of the two voltages across the bridge will cause the indicating lamps to light.

In testing the four conductors 11, 12, 13, and 14 simultaneously to determine if short circuits exist between any of the conductors, these wires are connected to the four terminals of the bridge as shown. Should a short circuit condition exist between any pair of conductors, say, between wires 11 and 12, it is obvious that the voltage across the arm 21 is effectively short-circuited, thus bringing terminals 15 and 16 to the same potential and causing the indicating lamp 27 in that arm to be extinguished. A short circuit between conductors 12 and 13 will likewise place terminals 16 and 17 at the same potential and cause the lamp 28 in that arm to go out. Should a short circuit exist simultaneously between all of the conductors, all of the indicating lamps will be extinguished, thus revealing the multiple short condition.

It will therefore be seen with reference to Fig. 1 that any short circuit or combination of short circuits between the four conductors undergoing test will cause the corresponding indicating lamps to go out, thus designating the defective conductors. The proposed circuit therefore enables the four conductors to be tested simultaneously for this condition without the need for multiple switching.

Applicant has discovered that in order to make this simultaneous test, the pair of impressed voltages should be displaced approximately 90° from each other. For the test to be successful, it is necessary that the indicating lamps remain lit at all times when no short circuit exists, which means that there must always be a resultant voltage across the bridge arms and diagonals. If, for example, two sources of direct current of equal value were used, as E1 and E2, it will be obvious that in two of the main four arms 21, 22, 23, and 24 of the bridge, the impressed voltages would cancel each other, thus causing the lights in these arms to be out even though a short circuit condition did not exist. The use of two alternating potentials which were in phase would have the same effect as the use of direct current in that the voltages across two of the bridge arms would cancel each other. The use of two alternating potentials exactly 180° out of phase would also have the same effect, as it would amount to no more than reversing the terminal connections of one of the D. C. sources.

By placing the two impressed voltages in quadrature through the use of the inductance 35 and the capacitance 36, it will be seen with reference to Fig. 2 that there will always be a resultant voltage across each of the bridge arms and voltage across the diagonals to cause the corresponding lamps to light in the absence of a short circuit condition. These two voltages will of course cancel each other momentarily in the various bridge arms twice in each cycle, but as this condition exists in any alternating current system, it does not affect the testing operation. It is apparent that the voltages would not have to be exactly 90° apart, as a satisfactory test can be obtained with voltage displacements somewhat above or below this figure. However, for best results the voltage displacement should approximate 90°.

With further reference to Fig. 1, the four leads under test are shown connected to a switch 40 which may be closed to connect all the leads together at 41. The use of this shorting switch enables all of the four conductors 11, 12, 13, and 14 to be tested simultaneously for continuity, as the simulated short circuit condition imposed on the wires causes all of the indicating lamps to go out unless there is an open circuit in one or more of the leads. Should conductor 14, for example, contain an open circuit, there would be no effective short circuit between terminal 18 of the bridge and terminals 15, 16, and 17, and as a result, the three lamps 30, 32, and 29 associated with the terminals 18 and lead 14 would not be extinguished. It is thus possible to tell at a glance which, if any, of the four conductors under test contains an open circuit.

Figure 3:
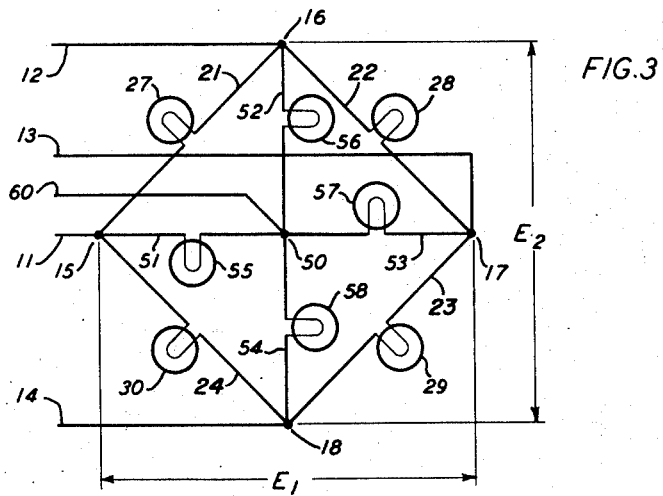
Fig. 3 is a schematic wiring diagram of the circuit used for testing five conductors simultaneously.

Fig. 3 shows the circuit applied to the simultaneous test of five conductors instead of four. This is done by joining the diagonals of the bridge at the point 50 to form diagonal arms 51, 52, 53, and 54, these arms having located therein indicating lamps 55, 56, 57, and 58. The short circuit test for the five conductors 11, 12, 13, 14, and 60 works on the same principle and in the same manner as the test involving four conductors. However, one difference between the two tests will be that a short condition between wires 11 and 13 and between wires 12 and 14 will be indicated by the extinguishing of two lamps instead of one, namely, by lamps 55 and 57 and lamps 56 and 58 respectively. For a short circuit condition between any other pair of wires, only one lamp will be extinguished as in the other test.

Another difference between the two tests lies in the fact that a shorted condition between conductors 11, 12, 13, and 14 and a similar condition between all five conductors cannot be distinguished, as either condition will extinguish all of the indicating lamps. However, a short circuit between four of the five wires, one of which is conductor 60, will indicate which wire is not shorted to these four. For example, if conductors 11, 12, 13, and 60 are shorted together, indicating lamps 30, 58, and 29 in the arms 24, 54, and 23 will remain lit to indicate that conductor 14 is not shorted to the others.

The circuit may also be used to provide a simultaneous alternating current breakdown test between five conductors, if the potential between conductors is made equal to the breakdown voltage requirements.

In place of the indicating lamps, alternating current relays may be used in the test circuit to control appropriate signal devices. Use of these relays requires the maintenance of the proper phase relationship between the two source voltages.

In addition to its use in the testing of a plurality of conductors, the invention is well suited to the testing of telephone jack circuits, as it provides a simultaneous test for short circuits between the tip, ring, sleeve, and frame elements, with immediate indication and designation of any defect.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. Test apparatus comprising four terminals for receiving conductors to be tested, four indicating devices connecting the terminals together as a bridge in conjugate pairs, other indicating devices interconnecting the terminals of each pair, means for applying an alternating potential between the two terminals of one pair and means for applying a second alternating potential essentially in quadrature with the first between the two terminals of the other pair.

2. Apparatus for indicating a short circuit condition between conductors comprising four indicating devices serially connected in a closed loop with terminals between the devices for receiving conductors to be tested, two other indicating devices each connected between a pair of alternate terminals of the loop and means for applying two alternating potentials essentially in quadrature with each other across the two alternate pairs of terminals.

3. Apparatus for indicating a short circuit condition between conductors comprising four indicating devices serially connected in a closed loop with terminals between the devices for receiving conductors to be tested, connections between the pairs of alternate terminals, said connections being joined and including four other indicating devices each connected between said juncture and a terminal, and means for applying two alternating potentials essentially in quadrature with each other across the two alternate pairs of terminals.

4. Apparatus for indicating continuity of conductors comprising four indicating devices serially connected in a closed loop with terminals between the devices for receiving the adjacent ends of conductors to be tested, two other indicating devices each connected between a pair of alternate terminals of the loop, means for applying two alternating potentials essentially in quadrature with each other across the two alternate pairs of terminals, and means for connecting the conductors together at the ends remote from the terminals.

JESSE A. CRANFORD.

REFERENCES CITED

The following references are of record in the file of this patent:

UNITED STATES PATENTS

| Number | Name | Date |
| --- | --- | --- |
| 761,280 | Woodbridge | May 31, 1904 |
| 2,431,794 | Dichter | Dec. 2, 1947 |
| 2,447,625 | Astin | Aug. 24, 1948 |
| 2,567,859 | Ringo | Sept. 11, 1951 |